United States Patent [19]

Olds

[11] 4,099,949

[45] Jul. 11, 1978

[54] METHOD OF REDUCING DETERIORATION OF ELECTRIC FURNACE REFRACTORY METAL COMPONENTS

[75] Inventor: Leonard Elmo Olds, Castle Rock, Colo.

[73] Assignee: Johns-Manville Corporation, Denver, Colo.

[21] Appl. No.: 827,925

[22] Filed: Aug. 26, 1977

Related U.S. Application Data

[63] Continuation of Ser. No. 737,805, Nov. 1, 1976, abandoned.

[51] Int. Cl.² ............................................. C03B 5/02
[52] U.S. Cl. .................................... 65/17; 65/32; 65/DIG. 2; 106/50; 106/52
[58] Field of Search ............... 65/12, 32, 19, DIG. 2; 106/50, 52

[56] References Cited

U.S. PATENT DOCUMENTS

| | | | |
|---|---|---|---|
| 2,581,440 | 1/1952 | Pincus | 106/52 |
| 3,066,504 | 12/1962 | Hartwig et al. | 65/32 |
| 4,057,408 | 11/1977 | Pierson et al. | 65/DIG. 2 |

*Primary Examiner*—Arthur D. Kellogg
*Attorney, Agent, or Firm*—Robert M. Krone; Joseph J. Kelly; James W. McClain

[57] ABSTRACT

A process is described for the reduction or prevention of deterioration of refractory metal components of an electric furnace by chromia-containing oxide melts. The process is based on the discovery of an unexpected series of oxidation/reduction reactions leading to formation of chromium trioxide and subsequent oxidation of the refractory metal (e.g., molybdenum or tungsten) by the chromium trioxide. The process comprises adding to the mixture of oxides in the furnace a component which is oxidized to an oxide with a lower free energy of formation per mole of oxygen than the refractory metal oxides (such as $MoO_2$, $MoO_3$, $WO_2$ or $WO_3$) and chromia, and which thus reduces $CrO_3$ to a compound which is inert to the refractory metal. In a preferred embodiment the additive is a carbonaceous material and may be in the form of powdered coal. The stoichiometric amount of additive will be about 20 to 50 percent by weight of the percent by weight of chromia present.

18 Claims, 2 Drawing Figures

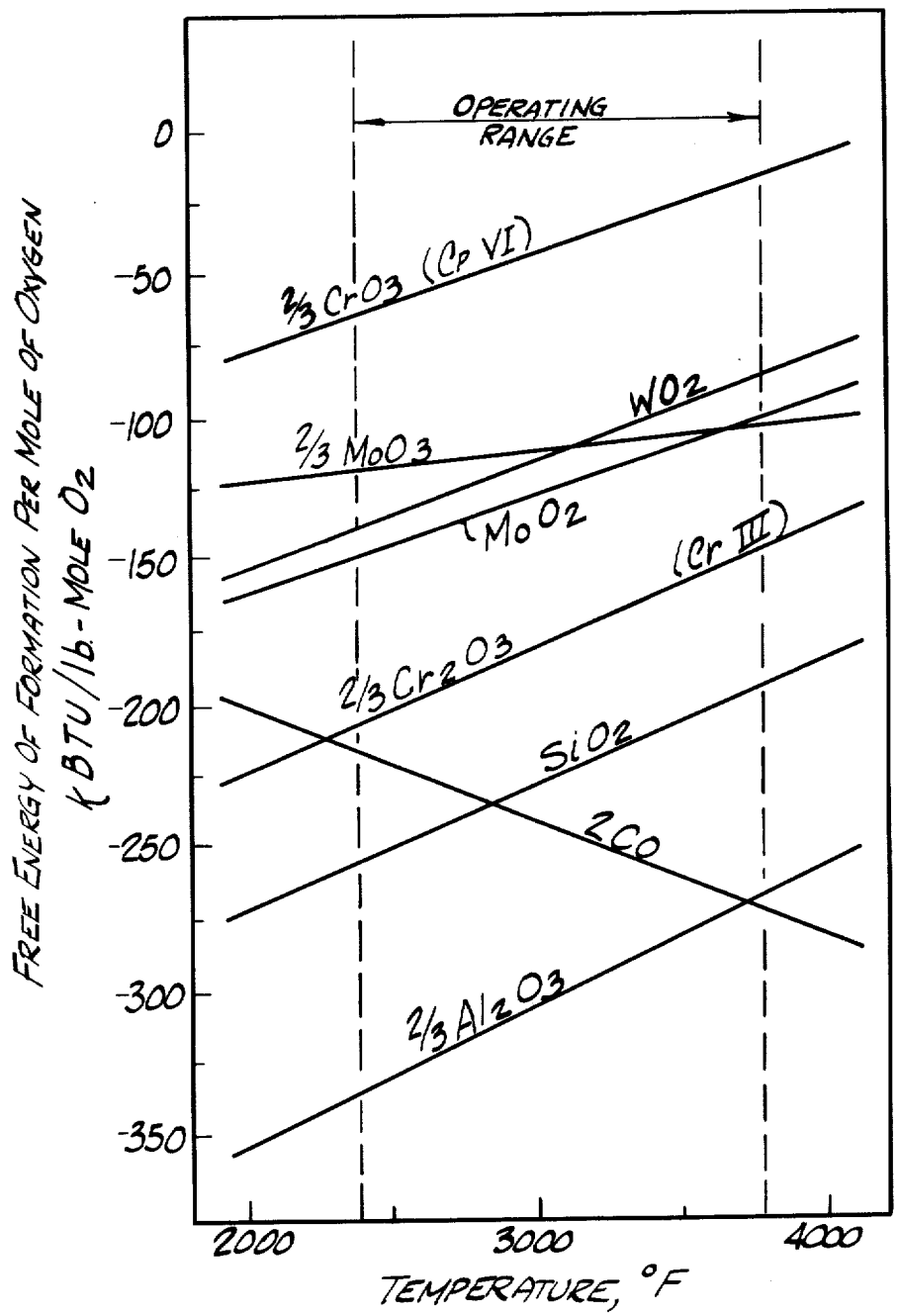

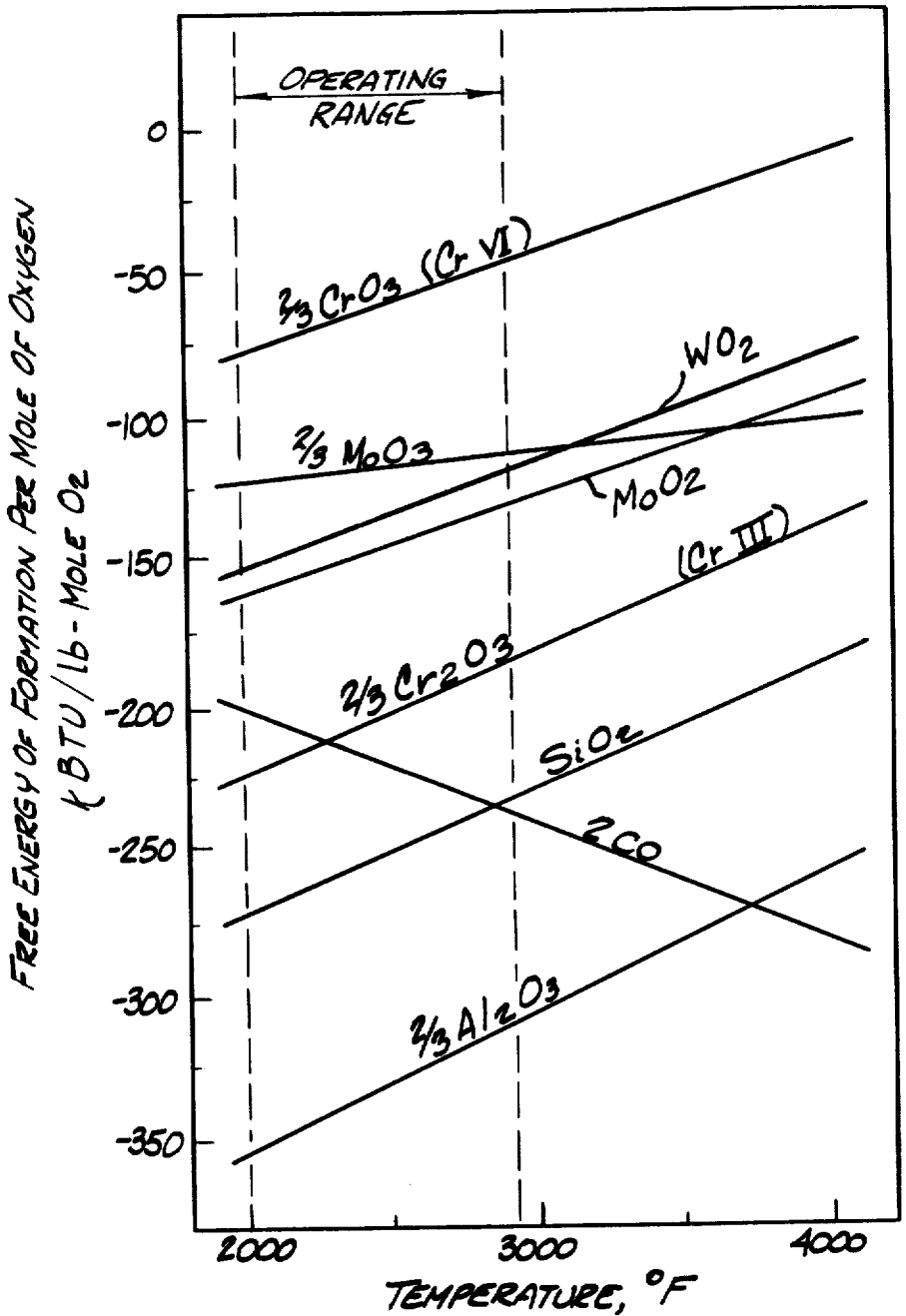

METHOD OF REDUCING DETERIORATION OF ELECTRIC FURNACE REFRACTORY METAL COMPONENTS

CROSS-REFERENCE TO RELATED APPLICATION

This application is a continuation of Application Ser. No. 737,805, filed Nov. 1, 1976 now abandoned.

BACKGROUND OF THE INVENTION

The invention herein relates to processes for melting refractory oxides in electric furnaces. More particularly it relates to a method for reducing or preventing the oxidative deterioration of refractory metal electrodes and orifices in such furnaces.

For a number of years electric melt resistance furnaces have been used to melt refractory inorganic oxides, commonly silica and alumina. These molten oxides can then be spun or blown into attenuated fibers which are used as thermal insulations. Those fibers which have relatively lower melting points are commonly referred to as "glass fibers" while those with relatively higher melting points are referred to as "refractory fibers." The glass fibers are used as thermal insulation for homes, office buildings and the like, while the refractory fibers are used as thermal insulation for furnaces, kilns and similar devices. These various types of fibers have melting points ranging from about 1000° F to about 3300° F or higher (about 540° C to about 1815° C or higher). There is no absolute line of demarcation between the fibers commonly termed "glass" and those commonly termed "refractory," but normally the latter are considered to be those intended for use at temperatures above about 1200° F (650° C).

Electric furnaces for melting such oxides commonly have the general shape of a bowl with a drain orifice in the center. Normally three or more electrodes are positioned around the orifice. The refractory oxides to be melted are charged, usually in powdered or granulated form, into the bowl shaped furnace such that they cover the orifice and the electrodes. After start-up using a high temperature flame to form an initial molten pool of oxides, electrical current passing through the electrodes and the molten oxides causes resistance heating of the oxides and in turn continued melting of the oxide materials. As the oxides melt they drain through the refractory metal orifice into fiber forming apparatus positioned below. In the meantime raw materials in the form of oxide powders are continually added to the furnace and in turn melted for fiberizing, thus resulting in continuous formation of an oxide melt and subsequent fibers. Frequently a melting and fiberizing operation, once started, will be run continuously for periods of many days, weeks of months. This means that the electrodes must operate satisfactorily for such periods, for once the melting operation has started there is often no opportunity to replace or repair the electrodes without shutting down the furnace. Even with those furnaces where electrodes can be replaced while the furnace remains in service, such replacement is both difficult and costly.

Similarly, the orifice must remain substantially unchanged in shape or dimensions during the entire run, for the flow of molten oxide into the fiberizing unit is controlled by this orifice. The orifice is formed with a specific and carefully calculated diameter, designed such that a closely controlled predetermined quantity of molten oxide drains down to the fiberizing unit located below the furnace. The quantity and especially the quality of the fiber formed is directly related to the flow rate of the oxide melt from the furnace through the orifice to the fiberizing unit. Control of such flow rate is maintained by a needle-like flow controller which operates in cooperation with the orifice to control the quantity of oxide flowing through the orifice. If the orifice deteriorates, it becomes substantially enlarged and can no longer cooperate with the "needle valve" control apparatus to regulate the flow of oxide melt through the orifice. The fiberizing unit thus becomes essentially "flooded" with excess oxide melt and can no longer function to produce satisfactory fiber. This deterioration of the orifice is more critical to the operation than the deterioration of the electrodes, for in some cases the electrodes can be moved and/or the electric current flow can be adjusted so as to compensate to some extent for the deterioration of the electrodes. However, the fixed orifice cannot readily be adjusted to compensate for the removal of the refractory orifice metal and resulting increase in the orifice diameter.

As noted, electric furnaces have been used successfully in the past to form "glass" melts which are primarily composed of mixtures of silica and soda, and "refractory" melts which are primarily composed of mixtures of silica and alumina. Frequently small amounts of other oxides, such as titania, zirconia, iron oxides or the like may be present, particularly with the lower temperature "glass fibers." Heretofore it has not been observed that any of these materials has had any unduly detrimental effect on the operation of the electric furnaces.

In recent years, however, refractory oxide fibers containing silica and alumina and up to about 10% chromia have found widespread use. Such fibers have been found to be very effective thermal insulations at temperatures up to about 2700° F (1480° C). Typical of such chromia containing fibers are those sold under the trademark CERACHROME by the Johns-Manville Corporation and described in U.S. Pat. No. 3,449,137 to Ekdahl.

Initially the chromia containing oxide melts were made in carbon arc furnaces for fiberization. Success of refractory metal electrode electric furnaces with other oxide melts led to attempts to form chromia containing melts in such furnaces. However, it was discovered that when melts containing approximately 0.5% to 10% or more by weight of chromia were used in electric furnaces, the refractory electrodes and orifices rapidly deteriorated and wore away. In some instances electrodes and orifices which would have served for a number of months with other types of oxide melts deteriorated in the presence of chromia so rapidly that the furnaces had to be shut down in a matter of a few hours or days. Prior to the invention herein, all such attempts to melt chromia containing oxides in electric furnaces with refractory metal electrodes and orifices have resulted in rapid deterioration of the electrodes and orifices and have been considered totally unsuccessful.

It is therefore an object of this invention to provide a method for permitting the melting of chromia containing oxide mixtures in electric furnaces in the presence of refractory metal electrodes and orifices (such as molybdenum) while still providing a satisfactory service life of the orifice and electrode components.

BRIEF DESCRIPTION OF THE INVENTION

The invention herein is based upon the surprising discovery that, unlike other oxides normally found in refractory oxide melts, chromia ($Cr_2O_3$, with a chromium valence of 3) oxidizes in the presence of the air which is normally in contact with the surface of the oxide melt to form chromium dioxide ($CrO_2$, with a chromium valence of 4) and chromium trioxide ($CrO_3$, with a chromium valence of 6). The chromium dioxide and trioxide compounds subsequently come into contact with the refractory metal electrodes and orifices where they are reduced by the refractory metal back to chromia causing oxidation of the refractory metal. The refractory metal oxides are then fluxed into the oxide melt resulting in deterioration and wear of the refractory metal furnace components.

This discovery of the oxidation/reduction mechanism of the chromium oxides and the resulting oxidation of the refractory metal orifice and electrodes in the presence of the chromia containing melts thus leads directly to the method of the present invention for preventing such deterioration, which method comprises supplying to the furnace, in addition to the oxide mixture, an additive material which is in less than its maximum valence or oxidation state and which will react with the higher valence chromium oxides to form one or more oxides which have lower free energies of formation per mole of oxygen than the oxides of the refractory metal such that the resulting compounds will not be reduced by refractory metal (e.g., molybdenum) electrodes or orifices. The oxides of the additive so formed must also have a lower free energy of formation than the higher chromium oxides, such that the additive material will also act to reduce any chromium dioxide or trioxide which is formed before it can attack the molybdenum components. The additive material may be in the elemental state or may be an oxide wherein the non-oxygen element in the oxide is in less than its maximum valence state. In one specific embodiment of the invention the additive is carbonaceous, and may be in the form of powdered coal. The reactive quantity of the additive, determined with consideration for the efficiency of the furnace, will be 25 to 50 percent by weight based on the weight of chromia present.

BRIEF DESCRIPTION OF THE DRAWINGS

FIGS. 1 and 2 are graphs of the variation with temperature of the free energy of formation per mole of oxygen of various oxides of chromium, molybdenum, tungsten, silicon, aluminum and carbon.

FIG. 1 indicates the typical operating temperature range for refractory fiber furnaces and FIG. 2 indicates the typical operating temperature range for fiber glass furnaces.

DETAILED DESCRIPTION AND PREFERRED EMBODIMENTS

The invention herein has as its basis the discovery of the mechanism of deterioration of refractory metal (e.g., molybdenum) electrodes and orifice in an electric furnace in which chromia containing oxides are melted; i.e., the discovery that chromia initiates a series of unexpected oxidation/reduction reactions ultimately leading to the formation of refractory metal oxides which flux into the melt. This discovery led to the process of the present invention, which is a method for eliminating or substantially reducing the tendency for this series of reactions to occur. Therefore the process of this invention is best understood by first considering the series of oxidation/reduction reactions which it has been discovered are occurring. To illustrate this series of reactions, they will be discussed in terms of compositions of the type described in the aforesaid U.S. Pat. No. 3,449,137 and with respect to an electric furnace with molybdenum components.

In this type of refractory fiber melt a typical composition is composed of 40 to 60 weight percent silica, 35 to 55 weight percent alumina and 1 to 8 weight percent chromia, the last being the sesquioxide or "chromic oxide," $Cr_2O_3$. As noted in that patent the prior art comprised aluminosilicate fibers formed of roughly equal mixtures of alumina and silica. These are still very widely used and are readily melted in electric furnaces with no significant problems of undue deterioration of the molybdenum electrodes or orifices. It is only when chromia is added as a component that the difficulties arise. It has now been discovered, as part of the discovery of the mechanism of the chromia induced deterioration, that the alumina and silica are essentially inert to the molybdenum metal because the silicon and aluminum in these respective oxides are each in their highest valence state and thus cannot be oxidized to a higher state. The chromia, however, represents a critically different situation.

The problem with chromia can be best understood by reference to FIGS. 1 and 2. These are plots of the variation with temperature of the free energy of formation per mole of oxygen of several of the oxides of interest herein. (The oxide curves are identical in each drawing; the drawings differ only in the indication of the operating ranges of the two groups of electric furnace operations.) If at a given temperature the free energy of formation of an oxide of a metal M is less (i.e. more negative or lower on the graph) than the oxide of a metal X, contact of metallic M with the X metal oxide will cause the M metal to be oxidized and the X metal oxide to be reduced. Thus, in FIGS. 1 and 2 the free energy of formation of either of the molybdenum oxides is less (or lower) than the free energy of formation of chromium trioxide. Consequently the contact of metallic molybdenum with chromium trioxide will result in oxidation of molybdenum and reduction of the chromium trioxide to chromia.

Conversely, if the free energy of formation of the oxide of metal M is greater (i.e. less negative or higher on the graph) than the free energy of formation of an oxide of metal X, the X metal oxide will be inert to the metal M and will not cause oxidation of the latter. Thus, in FIGS. 1 and 2 the free energies of formation of the molybdenum oxides are greater (or higher) than the free energy of formation of chromia. Therefore, chromia in contact with the molybdenum metal will not oxidize the latter.

The graphs of FIGS. 1 and 2 emphasize the surprising nature of the discovery of this invention. It has been known from such published graphs that alumina and silica have curves lying below the molybdenum oxide curves, thus indicating their inertness to metallic molybdenum. As noted above, these oxides have been found by experience indeed to be inert to the molybdenum electrodes and orifices of furnaces. Similarly, the same published graphs show chromia also to lie below the molybdenum oxide curves, thus clearly indicating that it too should be inert to the molybdenum. The addition of chromia to a melt, however, was as noted found to lead to rapid destruction of the molybdenum components. It was the surprising discovery of this invention that the chromia was being oxidized by contact with air to a higher valence form such as chromium trioxide, whose curve lies above the curves for the molybdenum oxides, that led to the process of this invention.

The process of this invention therefore comprises incorporating into a refractory oxide melt containing chromia a component (or "additive") which will minimize the opportunity for the chromia to be oxidized to chromium dioxide or trioxide and will act to reduce any such higher chromium oxides which are formed back to chromia before the higher oxides can come into contact with the refractory metal furnace electrodes and/or orifice.

For simplicity herein, the invention has been discussed primarily with respect to molybdenum metal components. However, the invention is not limited solely to furnaces utilzing molybdenum components. Other materials, including tungsten and tantalum metals and tungsten and molybdenum alloys are used or have been suggested for use in electric furnaces, and are thus "refractory metals" as defined for the purposes of this invention, for they will all be susceptible to chromia-induced oxidative deterioration. Other like materials, including rhenium, osmium and iridium as well as alloys of these and the above elements (including alloys with small amounts of other elements), will be readily apparent to those skilled in the art, and are to be included within the scope of this invention. (Other metals sometimes classified as "refractory," such as platinum and rhodium, are not included within the definition of "refractory metals" for the purposes of this invention, since their melting points are lower than the melting points of the oxides being melted in the furnace.)

A number of materials can be used as the additive component. These can be readily determined from published tables or graphs similar to those of FIGS. 1 and 2. A typical set of such tables and graphs will be found in Elliott et al, *Thermochemistry For Steelmaking*, Volume I (1960), especially pages 214-215. From these data it can be readily determined that materials such as calcium, aluminum, titanium, zirconium, magnesium, cerium, vanadium, silicon, and even chromium metal itself, may be used. Other materials such as manganese, iron, niobium, and sodium may also be used with lower temperature oxide melts. The additive material may also be an oxide in which the non-oxygen element is in less than its maximum oxidation state. Various mixtures and/or alloys of these materials are also suitable.

In this invention, however, it is preferred to use carbon or a carbonaceous material as the additive. One reason for this preference is that the metallic elements mentioned above form oxides which themselves become incorporated into the oxide melt and thus into the fibers thereafter formed. These oxides can serve as fluxes and can also adversely affect the temperature limitations of the fibers when used as thermal insulations. In many cases, particularly with the "glass fibers," such additions are not critical and the effects on the temperature limitations are of no consequence since the fibrous insulations are used at relatively low service temperatures. However, for the higher temperature refractory fibers such as those described in the aforesaid U.S. Pat. No. 3,449,137, maximum service temperatures of the insulation fibers are very important and the adverse effects of significant amounts of other metallic oxides in the fiber composition often cannot be tolerated. Unlike the metals, however, carbon forms gaseous oxides which are not incorporated to any significant degree into the oxide melt which flows to the fiberizing unit. Consequently the melt for fiberizing is not contaminated or diluted by oxides other than those which are intended to be incorporated.

Another reason for the preference for carbon or carbonaceous materials is economic. Normally such materials are cheaper and more readily available than many of the metals listed above.

A third reason for the preference will be seen from an examination of FIGS. 1 and 2. Unlike the metallic oxides whose free energies of formation increase with increasing temperature, the free energy of formation of carbon monoxide decreases rapidly with increasing temperature. Consequently the higher the temperature the greater is the tendency for the carbon to be oxidized in preference to the chromia.

The stoichiometric amount (or "reactive quantity") of additive required to substantially eliminate the oxidative erosion of the refractory metal electrodes and orifices in electric furnaces is dependent upon the amount of chromia present in the oxide melt. Normal amounts are from 25 to 50 weight percent, preferably 30 to 40 weight percent, of additive based on weight of chromia present in the oxide mixture. Since electric furnaces do not operate at full theoretical reaction efficiency, it will be necessary to add some excess of additive to ensure suppression of the refractory metal deterioration. However, the amount of excess additive will depend on the effect of the excess additive material on other oxides in the oxide melt and to the extent that the excess remains in the melt. As discussed above, in some instances large amounts of additive materials can be tolerated in the final fiber, while in other instances they cannot. The person skilled in the art can readily determine the optimum amount of additive to use in any particular set of furnace operating conditions.

When the additive is powdered or granular, as is usual, it preferably should be in a relatively finely divided state rather than being coarse particles. The exact dimensions of "fine" as compared to "coarse" particles will vary with the different types of additives, but can be readily determined by those skilled in the art. For the preferred carbonaceous additive, powdered coal, typical dimensions are, for "fine coal," 14% greater than 30 mesh (Tyler Seive Series) and 86% less than 30 mesh, and for "coarse coal," 63% greater than 30 mesh and 37% less than 30 mesh.

The additive component may be added to the oxide melt in the same manner that the oxide raw materials are added to the furnace. In one commonly used method the oxides are granulated to fine powders, mixed, and continuously spread in powdered form over the surface of the melt. The additive material, such as a carbonaceous material, may be similarly granulated and mixed with the oxide powders prior to spreading over the surface of the melt. Fresh additive material must be continued to be added to the oxide melt along with fresh oxide raw material, for the additive material is continually depleted by its oxidation.

The process of this invention was tested in a refractory fiber electric furnace having three molybdenum electrodes and a molybdenum orifice. The oxide melt used contained approximately 55 weight percent silica, 40 weight percent alumina and 4 weight percent chromia, with less than about one half weight percent of other oxides. This material was melted at a temperature of 3600° F (1980° C). In previous experiments using the same type of furnace and essentially the same composition, electrode and orifice deterioration had been so rapid that satisfactory fiber formation runs lasted no more than about forty hours. Since only a small quantity of fiber could be produced in that short time, and since the entire electrode and orifice system thereafter required complete rebuilding, such runs were considered uneconomical and totally unsatisfactory.

Thereafter, in order to test the process of this invention, carbon in the form of powdered bituminous coal in an amount of 36% by weight based on the weight of the chromia was added as a part of the oxide mix continuously over the length of the run. (An excess of coal was used in an amount calculated to yield the 36% as the quantity actually reacted based on the efficiency of the particular furnace.) This run lasted for 21 days and was terminated only when the desired amount of fiber had been formed. Thereafter the electrodes and orifice were inspected and were found to have suffered substantially less deterioration from the chromia than the electrodes in the control run described above.

The invention has been here described with reference to deterioration of refractory metal electrodes and/or orifices in electric furnaces. It will of course be understood that the invention also applies to any refractory metal component of the furnace which may come into contact with the chromia containing oxide melt and which is susceptible to chromia-induced oxidative deterioration.

What is claimed is:

1. A process for the reduction or prevention of chromia-induced oxidative deterioration of components made of refractory metal selected from the group consisting of molybdenum, tungsten, rhenium, tantalum, osmium and iridium and alloys thereof in an electric furnace in which a chromia-containing oxide mixture is melted, which process comprises:

supplying to the furnace in addition to the oxide mixture an additive material which is in less than its maximum valence state and which can be oxidized by chromium dioxide or chromium trioxide to an oxide which has a lower free energy of formation per mole of oxygen than the oxides of the refractory metal and chromia, such that in operation the additive material is oxidized in preference to the oxidation of the refractory metal, acts to reduce the higher chromium oxides to chromia, and forms an oxide which is inert to the refractory metal, the reactive quantity of said additive being present as 25 to 50 percent by weight based on weight of chromia in the mixture.

2. A process as in claim 1 wherein the reactive quantity of said additive is present as 30 to 40 percent by weight based on weight of chromia in the mixture.

3. A process as in claim 1 wherein said additive is in the elemental state or is an oxide wherein the non-oxygen element is in less than its maximum valence state.

4. A process as in claim 3 wherein said additive is carbon in the form of carbonaceous material containing carbon in the elemental state.

5. A process as in claim 4 wherein said carbonaceous material is coal.

6. A process as in claim 5 wherein the reactive quantity of said coal is present as from 30 to 40 percent by weight of the chromia in the mixture.

7. A process as in claim 3 wherein said additive is elemental calcium, aluminum, titanium, zirconium, magnesium, cerium, silicon, vanadium, chromium, manganese, iron, niobium, or sodium, or combinations thereof.

8. A process for the reduction or prevention of chromia-induced oxidative deterioration of components made of refractory metal selected from the group consisting of molybdenum, tungsten and tantalum and alloys thereof in an electric furnace in which a chromia-containing oxide mixture is melted, which process comprises:

supplying to the furnace in addition to the oxide mixture an additive material which is in less than its maximum valence state and which can be oxidized by chromium dioxide or chromium trioxide to an oxide which has a lower free energy of formation per mole of oxygen than the oxides of the refractory metal and chromia, such that in operation the additive material is oxidized in preference to the oxidation of the refractory metal, acts to reduce the higher chromium oxides to chromia, and forms an oxide which is inert to the refractory metal, the reactive quantity of said additive being present as 25 to 50 percent by weight based on weight of chromia in the mixture.

9. A process as in claim 8 wherein the reaction quantity of said additive is present as 30 to 40 percent by weight based on weight of chromia in the mixture.

10. A process as in claim 8 wherein said additive is in the elemental state or is an oxide wherein the nonoxygen element is in less than its maximum valence state.

11. A process as in claim 10 wherein said additive is carbon in the form of carbonaceous material containing carbon in the elemental state.

12. A process as in claim 11 wherein said carbonaceous material is coal.

13. A process as in claim 12 wherein said coal is present as from 30 to 40 percent by weight of the chromia in the mixture.

14. A process as in claim 10 wherein said additive is elemental calcium, aluminum, titanium, zirconium, magnesium, cerium, silicon, vanadium, chromium, manganese, iron, niobium, or sodium, or combinations thereof.

15. A process as in claim 8 wherein said refractory metal is molybdenum.

16. A process as in claim 8 wherein said refractory metal is tungsten.

17. A process as in claim 11 wherein said refractory metal is molybdenum.

18. A process as in claim 12 wherein said refractory metal is molybdenum.

* * * * *